(12) United States Patent
Sandberg et al.

(10) Patent No.: US 12,038,846 B2
(45) Date of Patent: Jul. 16, 2024

(54) PAGE TABLE STRUCTURE

(71) Applicant: Arm Limited, Cambridge (GB)

(72) Inventors: Andreas Lars Sandberg, Cambridge (GB); Stephan Diestelhorst, Cambridge (GB)

(73) Assignee: Arm Limited, Cambridge (GB)

(*) Notice: Subject to any disclaimer, the term of this patent is extended or adjusted under 35 U.S.C. 154(b) by 234 days.

(21) Appl. No.: 17/593,319

(22) PCT Filed: Jan. 3, 2020

(86) PCT No.: PCT/GB2020/050002
§ 371 (c)(1),
(2) Date: Sep. 15, 2021

(87) PCT Pub. No.: WO2020/188233
PCT Pub. Date: Sep. 24, 2020

(65) Prior Publication Data
US 2022/0188245 A1 Jun. 16, 2022

(30) Foreign Application Priority Data
Mar. 21, 2019 (GB) .................................. 1903901

(51) Int. Cl.
*G06F 12/1009* (2016.01)
*G06F 12/0817* (2016.01)
(52) U.S. Cl.
CPC ...... *G06F 12/1009* (2013.01); *G06F 12/0817* (2013.01)

(58) Field of Classification Search
CPC .................. G06F 12/1009; G06F 12/0817
See application file for complete search history.

(56) References Cited

U.S. PATENT DOCUMENTS

| 5,426,750 | A | * | 6/1995 | Becker | G06F 12/1027 711/208 |
| 5,790,979 | A | * | 8/1998 | Liedtke | G06F 12/1009 711/E12.059 |
| 5,978,892 | A | | 11/1999 | Noel et al. | |
| 2010/0037096 | A1 | | 2/2010 | Bum et al. | |
| 2017/0212844 | A1 | | 7/2017 | Williams et al. | |

(Continued)

FOREIGN PATENT DOCUMENTS

| JP | H0421047 A | 1/1992 |
| JP | 2018-181162 | 11/2018 |

(Continued)

OTHER PUBLICATIONS

Bedichek, Robert, "Some Efficient Architecture Simulation Techniques", Department of Computer Science, FR-35 University of Washington, 1990.

(Continued)

*Primary Examiner* — Gary W. Cygiel
(74) *Attorney, Agent, or Firm* — NIXON & VANDERHYE P.C.

(57) ABSTRACT

A page table structure for address translation may include a relative type of page table entry, for which an address pointer to a next-level page table entry or a translated address may be specified using a relative offset value indicating an offset of the address pointer relative to a reference-point base address.

18 Claims, 7 Drawing Sheets

(56) References Cited

U.S. PATENT DOCUMENTS

2018/0018278 A1     1/2018    Bradbury et al.
2018/0349286 A1*   12/2018   Rana ................... G06F 12/1009

FOREIGN PATENT DOCUMENTS

| JP | 2019-506670 | 3/2019 |
| TW | 201702882 | 1/2017 |
| TW | 201823971 | 7/2018 |

OTHER PUBLICATIONS

Office Action for TW Application No. 109101515 issued Jul. 21, 2023 and English translation, 25 pages.
Office Action for JP Application No. 2021-556779 issued Jan. 5, 2024 and English translation, 5 pages.

* cited by examiner

PAGE TABLE STRUCTURE

The present technique relates to the field of data processing. More particularly, it relates to page table structures for address translation.

A data processing system may have a memory management unit for performing address translation. The MMU may translate virtual addresses specified by program code to physical addresses identifying a storage location in memory. The translation may be based on address mapping information specified in a page table structure.

At least some examples provide an apparatus comprising: memory management circuitry to translate memory addresses based on page table entries defined in a page table structure comprising a plurality of levels of page tables stored in a memory system; and page table walk circuitry to obtain the page table entries from the page table structure for use by the memory management circuitry, each page table entry identifying an address pointer for identifying one of: a translated address, and an address of a child page table at a next level of the page table structure; in which: when a given page table entry is a relative type of page table entry specifying a relative offset value indicating an offset of the address pointer relative to a reference-point base address determined for the given page table entry, the page table walk circuitry is configured to determine the address pointer from the reference-point base address and the relative offset value.

At least some examples provide a method comprising: performing a page table walk to obtain, for use in translating memory addresses, page table entries from a page table structure comprising a plurality of levels of page tables stored in a memory system, each page table entry identifying an address pointer for identifying one of: a translated address, and an address of a child page table at a next level of the page table structure; in which: when a given page table entry is a relative type of page table entry specifying a relative offset value indicating an offset of the address pointer relative to a reference-point base address determined for the given page table entry, the address pointer is determined from the reference-point base address and the relative offset value.

At least some examples provide a computer program comprising: page table walk program logic to obtain page table entries from a page table structure comprising a plurality of levels of page tables, each page table entry identifying an address pointer for identifying one of: a translated address, and an address of a child page table at a next level of the page table structure; in which: when a given page table entry is a relative type of page table entry specifying a relative offset value indicating an offset of the address pointer relative to a reference-point base address determined for the given page table entry, the page table walk program logic is configured to determine the address pointer from the reference-point base address and the relative offset value.

At least some examples provide an apparatus comprising: memory management circuitry to translate memory addresses based on page table entries defined in a page table structure comprising a plurality of levels of page tables stored in a memory system; and page table walk circuitry to obtain the page table entries from the page table structure for use by the memory management circuitry, each page table entry identifying an address pointer for identifying one of: a translated address, and an address of a child page table at a next level of the page table structure; in which: when a given page table entry specifies a descendant-entries-restricted indicator, the page table walk circuitry is configured to signal a fault when a descendant page table entry of the given page table entry identifies an address pointer lying outside a bounding address region identified by the given page table entry.

At least some examples provide a method comprising: performing a page table walk to obtain, for use in translating memory addresses, page table entries from a page table structure comprising a plurality of levels of page tables stored in a memory system each page table entry identifying an address pointer for identifying one of: a translated address, and an address of a child page table at a next level of the page table structure; in response to detecting that a given page table entry specifies a descendant-entries-restricted indicator, and a descendant page table entry of the given page table entry identifies an address pointer lying outside a bounding address region identified by the given page table entry, signalling a fault.

At least some examples provide a computer program comprising: page table walk program logic to obtain page table entries from a page table structure comprising a plurality of levels of page tables, each page table entry identifying an address pointer for identifying one of: a translated address, and an address of a child page table at a next level of the page table structure; in which: when a given page table entry specifies a descendant-entries-restricted indicator, the page table walk program logic is configured to signal a fault when a descendant page table entry of the given page table entry identifies an address pointer lying outside a bounding address region identified by the given page table entry.

The computer programs described above can be stored on a computer-readable storage medium, which may be a non-transitory storage medium or transitory storage medium.

Further aspects, features and advantages of the present technique will be apparent from the following description of examples, which is to be read in conjunction with the accompanying drawings, in which:

FIG. 1 schematically illustrates an example of a data processing system including at least one memory management unit for handling address translation;

FIG. 2 schematically illustrates an example of a page table walk for obtaining page table entries from a page table structure;

Figure 1:
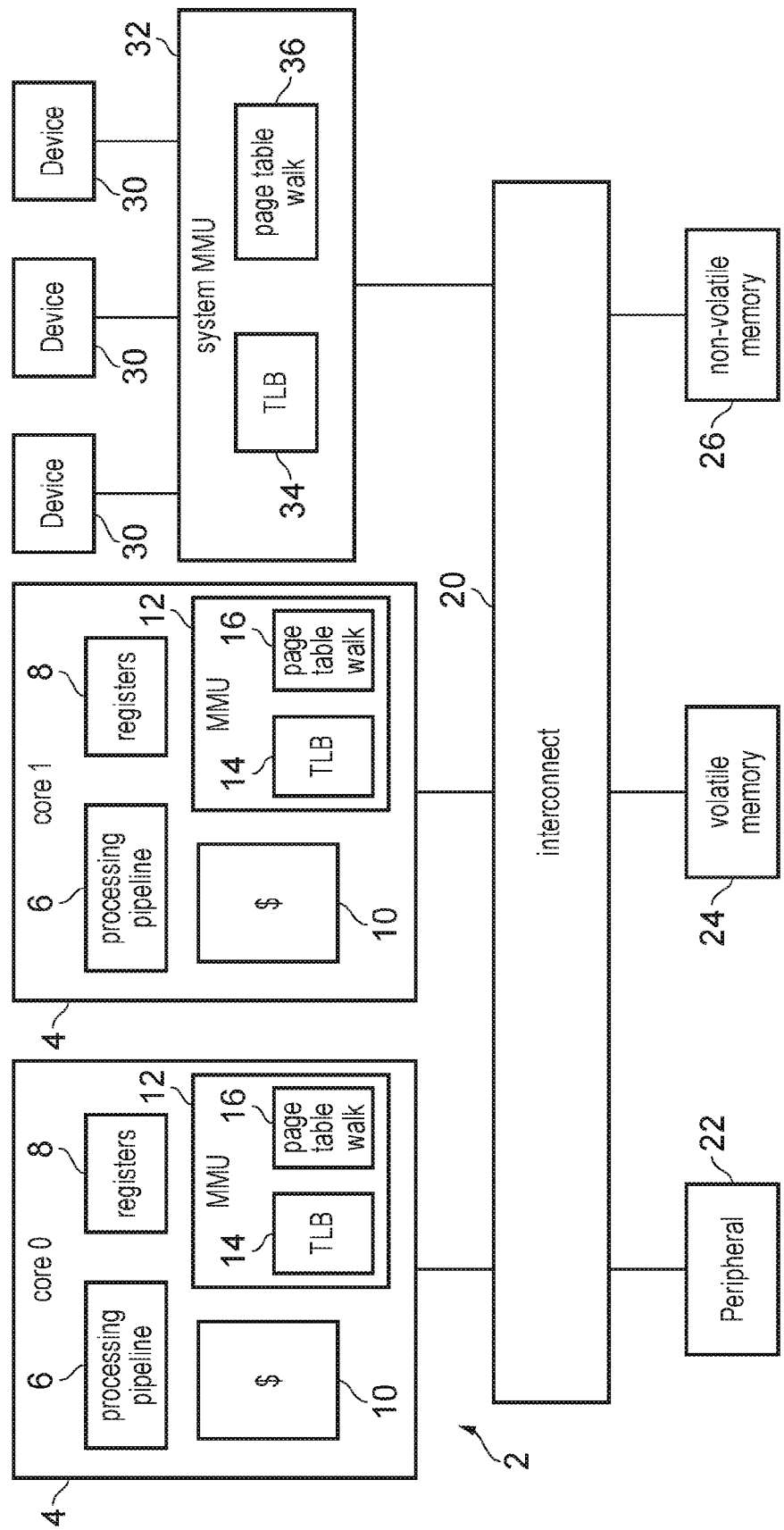

An apparatus may have memory management circuitry for translating memory addresses based on page table entries (PTEs) defined in a page table structure stored in a memory system. The page table structure may include two or more levels of page tables. Page table walk circuitry may be provided to obtain PTEs from the page table structure, for use by the memory management circuitry. Each PTE may identify an address pointer for identifying either a translated address or an address of a child page table at a next level of page table structure. Entries specifying a translated address may be called block entries or leaf entries. The translated address could be an intermediate physical address or a physical address. PTEs which have an address pointer pointing to a child page table at a next level of the page table structure may be called table entries or branch entries. The PTE which points to a given child page table may be called a parent PTE of that child page table, and may also be referred to as a parent PTE of all of the child PTEs within the child page table. The child PTEs of a given PTE, as well as any grandchild or further generation PTEs in subsequent levels of page tables which are accessed via the address pointers in the child PTEs, may be referred to as descendant PTEs of the given PTE.

When performing a page table walk, portions of a target address to be translated may be used to select one of the PTEs from the page table at each level of the page table structure. A first portion of the target address is used to select a PTE from the level 0 page table. The selected level 0 PTE provides an address pointer to a level 1 page table, and a second portion of the target address is used to select a particular PTE from the level 1 page table, and so on for each subsequent level until a block entry is reached which provides the address pointer used to determine the translated address corresponding to the target address. Using a multi-level page table structure can be useful for improving memory efficiency because (unlike with a single linearly-indexed table structure), it is not necessary to allocate, for storage of the page table structure, a single contiguous block of memory of size proportional to the overall size of the address space being mapped.

In typical page table structures, the address pointer for identifying the translated address or the address of a child page table is specified as an absolute address. Hence the given PTE may specify an address value which directly identifies the address pointer.

In contrast, with the approach discussed below, the page table walk circuitry supports a page table structure which includes a relative type of PTE. The relative type of PTE specifies a relative offset value identifying an offset of the address pointer relative to a reference-point base address determined for that given PTE. Hence, when a given PTE is defined as the relative type of PTE, page table walk circuitry may determine the address pointer of that entry from the reference-point base address and the relative offset value defined in the given PTE.

By using address pointers specified as a relative offset relative to a base address, this can reduce the overhead of remapping of an address space. A supervisory process (e.g. an operating system or hypervisor) may be responsible for managing address translation by defining the page table structure. When a section of the page table structure is defined using the relative type of PTEs, then simply by changing the reference-point base address for a given PTE, subsequent address pointers calculated relative to that reference-point base address can automatically be relocated to a different region of memory, to avoid the supervisory process having to individually update the absolute pointers in many PTEs.

This can be particularly useful for systems using non-volatile memory, where it may be desirable to store persistent page table fragments within the non-volatile memory. For example, executable program code stored in the non-volatile memory could contain one or more relative page tables which comprise the relative type of PTEs. This means that, to map the executable into memory, the operating system may simply set up a PTE that points to the relative page table in the non-volatile memory, and the relative type of PTEs within that page table may then automatically map all of the sections of the executable into memory without the operating system needing to individually specify each descendant entry using absolute pointers. If the non-volatile memory later needs to be mapped to a new region of the address space, it is not necessary for the operating system to update all of the PTEs in the corresponding part of the page table structure, as simply updating the base address from which those relative pointers are derived can be sufficient to remap the entire relative portion of the page table.

In addition to the relative type of PTE, the page table walk circuitry may also support an absolute type of PTE. When the given PTE is an absolute type of PTE specifying an absolute address value directly specifying the address pointer, the page table walk circuitry may determine the address pointer from the absolute address value. In this case there is no need to determine a reference-point base address.

Regardless of whether a PTE is of the relative type or the absolute type, for table PTEs the address pointer may identify a base address of the child page table at the next level of the page structure, and the address of a specific child PTE to access within the child page table at the next level may correspond to the sum of the address pointer and a next-level index portion of the target address to be translated. Hence, address pointers may be size-aligned to a page size boundary, so that a least significant portion of bits of the address pointer is always 0 and so does not need to be explicitly specified in the PTE (the number of bits in the "always 0" portion may depend on a system configuration). On the other hand, for block PTEs the address pointer may specify the most significant portion of bits of the translated address, and the least significant portion of bits of the translated address may be mapped directly from corresponding bits of the target address being translated. For an absolute type of PTE, the most significant portion of the child PTE address or the most significant portion of the translated address is specified as an absolute value directly specified in the absolute type of PTE. For a relative type of PTE, the most significant portion of the child PTE address or the most significant portion of the translated address is specified using the relative offset value specified in the relative type of PTE, which is added or appended to the reference-point base address determined for that relative type of PTE. The reference-point base address associated with a relative type of PTE may be either the same as, or different to, the base address of the page table comprising the relative type of PTE.

Whether a given PTE is of the relative type or the absolute type can be determined based on a type indicator specified in a parent PTE at a previous level of the page table structure. Hence, the type of PTE is not specified in the PTE itself, but in the PTE's parent entry. This can improve security because it means that a supervisory process responsible for a given level of the page table structure can control whether a subsequent level is allowed to use relative address pointers, which can be useful for enabling delegation of responsibility for subsequent levels to another process or party, while still maintaining security. For example, the supervisory process may wish to enforce that a subsequent level must use relative pointers to avoid a delegated process (to which management of subsequent levels of the page table structure is delegated) being able to specify arbitrary absolute pointers which could extend beyond the region of the address space allocated for that delegated process.

The page table walk circuitry may signal a fault in response to detecting that a child PTE of a given PTE is the absolute type when the given PTE is the relative type. Hence, once a certain level of the page table structure specifies that the next level is the relative type, then any descendants of the relative type of PTE would also need to be of the relative type. This ensures that a supervisory process can be confident that, when it remaps the reference-point base address associated with the earliest level of relative type of PTE, then this also remaps the address pointers of all subsequent descendent entries, as if any subsequent address pointers were of the absolute type, they will cause a fault, so cannot lead to a valid memory access.

In some implementations, the top-level PTE of the page table structure may be restricted to be the absolute type of PTE. Hence, the first level of PTE which can be the relative type may be the second level of the table structure.

Alternatively, in other examples the top-level PTE could also be allowed to be the relative type of PTE. For example, a translation table base register which provides the address of the top-level PTE could specify an indication of whether the top-level PTE is of the absolute type or relative type.

The relative type of PTE may be used both for table PTEs (branch PTEs) and for block PTEs (leaf PTEs). Hence even for the leaf PTE, for which the address pointer identifies the translated address, such a PTE is allowed to be the relative type of PTE.

The reference-point base address could be determined in different ways for a given PTE of the relative type. The reference-point base address may be non-zero for relative type PTEs. In one approach, the page table walk circuitry may determine, as the reference-point base address for the given entry, a size-aligned address which corresponds to a result of aligning an address of a page table comprising the given PTE to an address size boundary which is selected based on a size parameter specified by a parent PTE of the given PTE. Hence, with this approach the reference-point base address does not need to be explicitly identified in the PTE, but can be implicitly determined based on the size specified by the parent PTE and an address of the page table which comprises the given PTE. The size specified by the parent PTE could match the size of the page table comprising the given PTE, and in this case the reference-point base address may be the same as the base address of the page table comprising the given PTE. Alternatively, the size specified by the parent PTE could be larger than the size of the page table comprising the given PTE, and in this case the reference-point base address may be different to the base address of the page table comprising the given PTE. The size-alignment of the base address may correspond to clearing to 0 a certain number of least significant bits of the base address, where the number of bits cleared to 0 depends on the specified size.

By using a size-aligned address as the reference-point base address, this means there is no need for an adder for computing the relative address pointer from the reference-point base address and the relative offset value, as the relative offset value can simply be appended to the right of the least significant non-cleared bit of the size-aligned reference-point base address. Eliminating the need for adders can improve performance because a carry propagate adder may be relatively slow to ripple carries from the least significant end to the most significant end of the sum being calculated.

Another advantage of implicitly determining the reference-point base address from a size-alignment of the address of the page table comprising the given page table entry, is that this can simplify control for constraining that the regions of the address space accessible via descendent PTEs of a given relative PTE lie within the region defined by the reference-point base address and size for the given PTE. This can again be useful for security, as it means a supervisory process can have confidence that when designating control over subsequent levels of the page table structure to another process using relative type of PTE, the delegated process cannot define address pointers outside a defined region of the address space.

Alternatively, another way of determining the reference-point base address may be that the given PTE specifies a block table entry identifier which points to a selected entry of a block table, which is a separate table structure from the page table structure. The selected entry of the block table may specify the reference-point base address. Hence, in this example, the page table walk circuitry obtains the reference-point base address for the given PTE from a selected entry of the block table which is identified by the block table entry identifier specified in a parent PTE of the given PTE. Although this approach may require slightly more overhead on remapping the address space, it can offer more flexibility for a supervisory process to define the address regions mapped for use in relative page tables. Regardless of whether the reference-point base address is implicitly determined by size aligning the base address or the explicit approach where a block table used, the parent PTE is able to control the region in which relative-specified address pointers of the child PTEs of that parent PTE are allowed to be specified, which can be useful for security when delegating responsibility for managing the subsequent level of page table to another process or party.

To simplify the calculation of relative address pointers, the reference-point base address may be constrained to be a size-aligned address (for which a number of least significant bits are zero—note these zero bits may not need to be explicitly identified in any stored representation of the reference-point base address, as for reducing storage overhead the bits known to be zero can be omitted and left implicit). The size-alignment constraint could be achieved by construction (e.g. when the reference-point base address is calculated by size aligning the base address of the corresponding page table as discussed above), or could be enforced by signalling a fault if the base address specified in a relevant block table entry has been specified as a non-size-aligned address.

The address pointer specified by the relative type of PTE may be bounded to lie within a certain bounding address region, which may be specified through a reference-point base address and a size parameter associated with the relative type of PTE. As discussed above, the reference-point base address and size could be specified within a selected entry of a block table identified by the parent PTE of the given PTE, or alternatively the size parameter for the given PTE could be specified by the parent PTE of the given PTE, and the reference-point base address could be implicit from a size-aligned address of the page table which includes the given PTE.

When the given PTE is the relative type of PTE, the page table walk circuitry may signal a fault when the address pointer specified by a descendent PTE of the given PTE is outside the bounding address region identified for the given PTE. This can improve security because it allows a supervising process to have confidence that no descendant PTE of the relative type of PTE can specify an address pointer which extends outside the defined bounding address region. This is useful because one benefit of the use of relative types of PTE can be that this can allow the supervising process to delegate the management of the relative portion of the page table to others, e.g. delegating responsibility to the developer of an executable which is to be stored in non-volatile memory specifying a relative fragment of the page table. However, in some cases, the operating system or other supervising process may not be able to trust that a certain non-volatile memory device or software process will behave appropriately. By signalling a fault when an address mapping has been defined in a descendant PTE of a relative PTE, which results in an address pointer extending outside the bounding address region specified by the supervising process, this improves security by constraining the relative fragment of the page table structure to define address pointers within a confined region, so that the delegated process cannot access inappropriate memory addresses lying in other regions of the address space.

In the example discussed above where the reference-point base address is determined as the size-aligned address obtained by aligning the address of the page table comprising the given page table entry, such a check of the bounding address region could be implemented by comparing the size parameter specified by a parent PTE with the size parameter specified by its child PTE. If a given child PTE specifies a larger size parameter than its parent PTE, then a fault may be triggered. Provided each successive descendant of a relative type of PTE specifies either the same size or a smaller size than its parent, then the calculation of the reference-point base address by size-alignment of the page table address to the specified size boundary may be enough to ensure that any subsequent address pointers in descendant PTEs are defined within the bounding address region identified for the given PTE. This avoids the need to record tracking data tracking the bounding address regions identified for earlier ancestor PTEs to check whether address pointers several levels down the table structure are allowable, as instead the bounding address region enforcement can simply be achieved by a comparison of two size parameters (for a parent and child PTEs), at each step down the table. If at a given level the child PTE is verified as passing the size check (the child PTE specifies a size no greater than the size specified by the parent PTE), then the indication of the parent PTE size can be discarded as it is no longer needed for the size checks at subsequent levels of the page table structure.

On the other hand, if more arbitrary definitions of the reference-point base address are permitted, e.g. based on the block table as discussed above, then the check of whether the address pointer specified by a descendant page table entry of the given page table entry is outside the bounding address region identified for the given page table entry can be based on tracking information recorded based on earlier ancestor PTEs traversed in the page table walk. For example, on encountering a given PTE, the bounding address region defined for that PTE may be indicated in the tracking information, and then subsequent address pointers of descendant PTEs encountered in the page table walk can be compared against the tracking information to determine whether to trigger a fault. This approach may require more overhead in storing the tracking information and providing address comparators, but may offer more flexibility in defining the address mappings for subsequent entries of the table than in the size-aligned approach discussed above.

The use of relative type of PTEs, with a size-aligned base address and comparison of sizes specified by parent/child PTEs is one way in which it can be enforced that descendant PTEs cannot validly specify an address pointer outside a bounding address region defined for an ancestor PTE.

However, it can also be useful to be able apply such a restriction on the bounds within which descendant address pointers can be specified, when using absolute type of PTEs. Hence, more generally, a given PTE could specify a descendant-entries-restricted indicator, and the page table walk circuitry may signal a fault when a descendant PTE of a given PTE identifies an address pointer lying outside a bounding address region identified by the given PTE. In some examples, the descendant-entries-restricted indicator could simply be the type indicator specifying whether a given PTE is the absolute type or relative type, so that relative type of PTEs may by definition be considered to be descendant-entries-restricted, while the absolute type PTEs may not be descendant-entries-restricted.

However in other examples, the descendant-entries-restricted indicator could be a separate indicator to the indicator of whether descendant entries are of the absolute type or relative type. Hence, a parent PTE which designates that entries in its child page table are of the absolute type could specify the descendant-entries-restricted indicator to indicate that the absolute child PTEs are constrained to define their address pointers within certain bounds, and a fault may be signalled if those child PTEs specify an address pointer outside those bounds.

Also in some cases, systems not supporting the relative type of PTE at all could still use the descendant-entries-restricted indicator to indicate whether all subsequent address pointers in descendant PTEs must lie within a certain bounding address region. Even if relative type of entries are not supported, the restriction on descendant entries can be useful to provide confidence that, once a given PTE specifies a given bounding region of the address space, then all subsequent entries descending from that entry would also need to specify address pointers lying within that bounded address region, which can be useful for allowing management of certain portions of the table structure to be delegated to other processes which may potentially be untrusted.

Again, the bounding address region can be specified in different ways. In one example, the bounding address region is a region of specified size starting at a reference-point base address, and the given PTE may specify a size parameter indicating the specified size. In this case, the reference-point base address for the bounding address region may be determined as a size-aligned address corresponding to a result of aligning an address of a page table comprising the child PTE to an address size based on the size parameter specified by the given PTE. Hence, with this approach the determination of the bounding address region can be similar to the approach discussed above for calculation of the reference-point base address for relative type of PTEs.

Alternatively, the base address and the size of the bounding address region can be specified within an entry of a block table which is identified by a block table entry identifier specified in the given PTE.

The techniques discussed above can be implemented in an apparatus with specific circuitry is provided in hardware to define the memory management circuitry and page table walk circuitry.

However, it is also possible to emulate the functionality of the page table walk circuitry in software, within a computer program for controlling a host data processing apparatus to provide an instruction execution environment for execution of instructions. The computer program may comprise page table walk program logic which functions in a corresponding way to the page table walk circuitry discussed above, with support for relative types of PTEs and/or PTEs specifying a descendant-entries-restricted indicator as discussed above. Such a program can be useful for allowing a host data processing apparatus, which does not itself have native hardware support for the types of page table structure discussed above, to execute program code written for use with a processor architecture which does support these features.

FIG. 1 schematically illustrates an example of a data processing system 2 comprises a number of processor cores 4. Each core includes a processing pipeline 6 for fetching instructions from memory, decoding the instructions, and performing data processing operations in response to the decoded instructions. Registers 8 are provided for storing operands for the data processing operations. Results of the processing operations are written back to the registers 8. The core 4 may include at least one cache 10 for caching data from the memory system for faster access by the core.

The core 4 also has a memory management unit 12 for managing address translations between virtual addresses specified by instructions processed by the pipeline 6 and the physical addresses used to identify locations within the memory system. Address translation is controlled based on at least one page table structure stored in the memory system. In some examples, a two-stage translation may be used, where virtual addresses are translated into intermediate physical addresses in a first stage of address translation, and then the intermediate physical addresses are translated into physical addresses directly identifying the corresponding memory locations in a second stage address translation. This can be useful for supporting virtualisation, where a virtualised operating system may define the address mappings associated with the first stage of address translation, assuming it is the only operating system present and in the belief that the intermediate physical addresses generated in the stage 1 translation are actually physical addresses, but a hypervisor which manages the virtualisation of respective operating systems on the same physical platform may define the second stage of address translation to map the intermediate physical addresses defined by different operating systems onto different portions of the physical address space. Hence, the stage 1 translation may be controlled based on a stage 1 page table structure comprising two or more levels of page table entries, and the stage 2 translation may be controlled based on a stage 2 page table structure comprising two or more levels of page table entries.

The MMU 12 may include a translation lookaside buffer (TLB) 14, which is a cache of some page table entries of the page table structure(s). The MMU may also include page table walk circuitry 16 for performing a page table walk operation to obtain PTEs from the page table structure(s) stored in memory, for use in the address translation. PTEs, or information derived from PTEs, obtained in the page table walk can be allocated to the TLB 14, so that on future access to the same memory address the translation can be performed faster.

The processor cores 4 may communicate via an interconnect 20, which may manage coherency between the respective caches 10 and TLBs 14 for the respective processor cores. Via the interconnect 20, the cores can request access to the underlying memory system which may include various peripheral devices 22, one or more modules of volatile memory 24 such as dynamic random access memory (DRAM) and one or more modules of non-volatile memory 26 such as Flash memory.

The system 2 may also include one or more master devices 30 which may request access to memory, but which unlike the processor cores 4 may not themselves have an internal memory management unit (MMU) 12. Examples of such devices 30 may include a display controller, a network interface controller, a graphics processing unit (GPU), etc. A system MMU 32 may be provided between the master devices 30 and the interconnect 20, to provide the master devices 30 with similar address translation functionality to that provided by the MMU 12 within the cores 4. Similar to the MMUs 12, the system MMU 32 may include a TLB 34 and page table walk circuitry 36.

Figure 2:
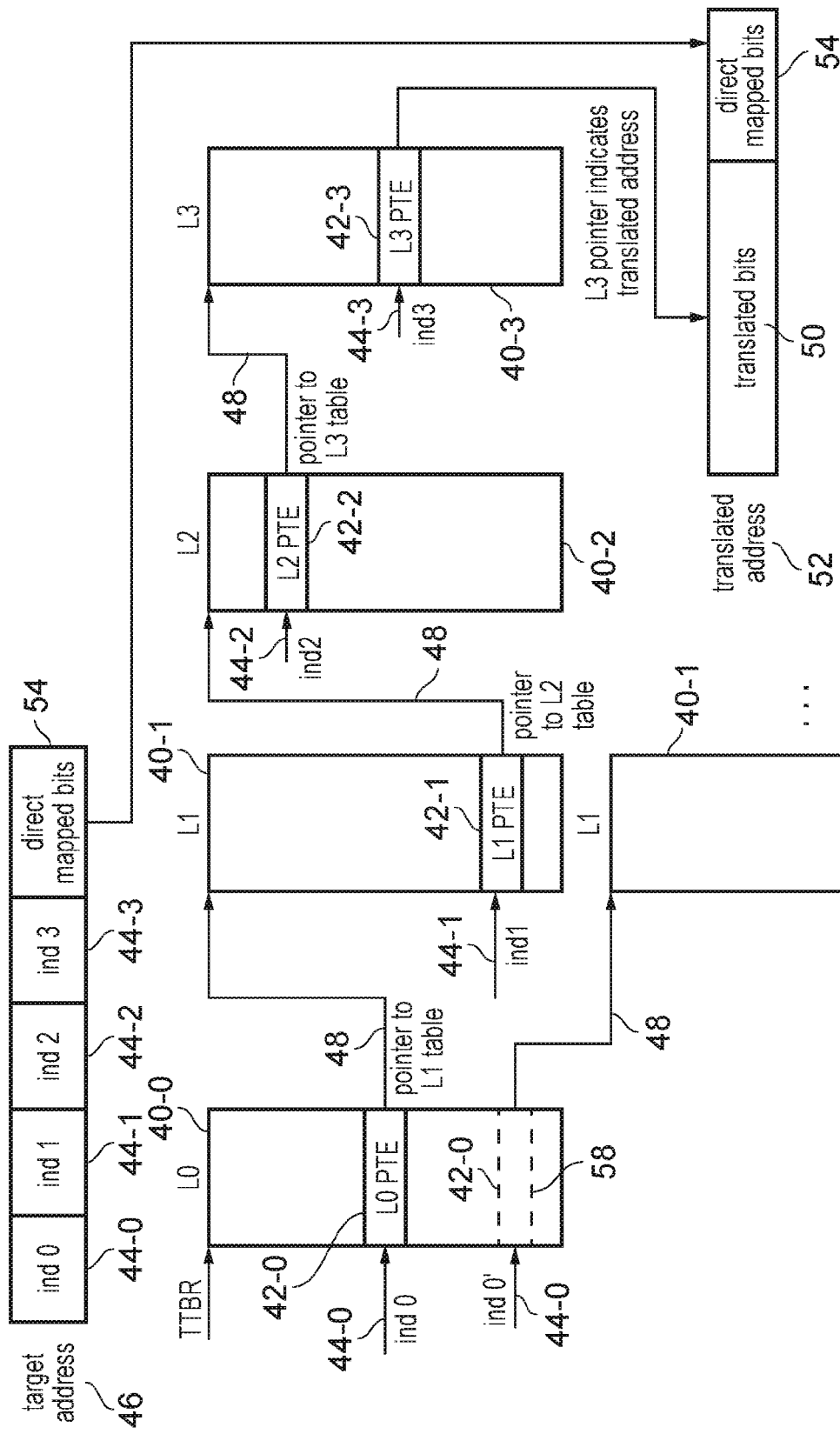

As shown in FIG. 2, the MMUs 12, 32 may control address translation based on a page table structure stored in a memory system, which comprises a number of levels of page tables 40, each page table 40 comprising a number of page table entries (PTEs). Each page table 40 is stored in a given page of the address space being mapped using the page table structure. Each page table 40 is associated with a given level of the page table structure, and a PTE 42 at one level may include an address pointer 48 to a page table 40 at the next level of the page table structure. PTEs 42 which point to a subsequent page table are known as table entries or branch entries. The final level of page table for a given branch of the page table structure may include a block entry or leaf entry, which specifies an address pointer for identifying the translated memory address which corresponds to the target address for which the translation was requested. In the example shown in FIG. 2 the indicated PTEs 42-0, 42-1, 42-2 at levels 0, 1 and 2 are table entries and the level 3 PTE 42-3 is a block entry.

When a memory access request is issued by the processing pipeline 6 of a processor core 4 or by a given master device 30, to request read or write access to a memory location associated with a certain target address 46, the corresponding MMU 12, 32 performs an address translation to translate the target address 46 into a translated address 52. If the relevant address mapping is already cached within the TLB 14, 34, then the translated memory address can be returned relatively quickly, but otherwise at least part of a page table walk may be performed.

FIG. 2 shows a full page table walk operation for traversing the page table structure associated with a single stage of address translation:

A translation table base address is stored in a translation table base register (TTBR) of the MMU 12, 32, and points to the base address of a level 0 page table 40-0 of the page table structure.

A level 0 index portion 44-0 of the target address 46 is used to index into a selected PTE 42-0 of the level 0 page table 40-0.

The selected level 0 PTE 40-0 includes an address pointer 48 which identifies a base address of a particular level 1 page table 40-1 of the page table structure.

A level 1 index portion 44-1 of the target address 46 is used to select a level 1 PTE 42-1 from the level one page table 40-1.

The selected level 1 PTE 42-1 specifies an address pointer identifying a base address of a level 2 page table 40-2.

A level 2 PTE 42-2 is selected from the level 2 page table 40-2 based on a level 2 index portion 44-2 of the target address 46.

The level 2 PTE 44-2 includes an address pointer identifying the base address of a level 3 page table 40-3.

A level 3 PTE 42-3 is selected from the level 3 page table 40-3 based on a level 3 index portion 44-3 of the target address 46.

The level 3 PTE 42-3 is a block PTE whose address pointer provides the most significant portion 50 of the translated address 52. The most significant portion 50 of the translated address 52 replaces the bits of the target address 46 corresponding to the index portions 44-0 to 44-3. Remaining bits 54 of the target address 54 are mapped directly into corresponding bits 54 of the translated address 52, without change.

FIG. 2 shows a single stage of address translation, but in an MMU which implements two stage of address translation, the first stage of address translation may translate a virtual address into an intermediate physical address and the second stage of address translation may translate an intermediate physical address into a physical address. However, each of the address pointers 48 which are provided by PTEs within the first stage of address translation may themselves be specified as an intermediate physical address (IPA), and so may require a translation into a physical address (PA) in a second stage of address translation before the next level of the stage 1 page table structure can be accessed. Also, the translation table base address in the TTBR may be specified as an IPA, so it may also need translating in stage 2 before the stage 1 level 0 page table can be accessed. Hence in practice, each successive step through the level one page table structure may be separated by multiple levels of page table walk through the stage 2 page table structure. That is, when the full page table walk operation is required for a 2-stage address translation, the sequence may be as follows:

- stage 2 level 0; stage 2 level 1; stage 2 level 2; stage 2 level 3 (to translate the stage 1 level 0 base address in TTBR from IPA to PA);
- stage 1 level 0 (to obtain stage 1 level 1 base address specified as IPA);
- stage 2 level 0; stage 2 level 1; stage 2 level 2; stage 2 level 3 (to translate the stage 1 level 1 base address from IPA to PA)
- stage 1 level 1 (to obtain stage 1 level 2 base address specified as IPA);
- stage 2 level 0; stage 2 level 1; stage 2 level 2; stage 2 level 3 (to translate the stage 1 level 2 base address from IPA to PA)
- stage 1 level 2 (to obtain stage 1 level 3 base address specified as IPA);
- stage 2 level 0; stage 2 level 1; stage 2 level 2; stage 2 level 3 (to translate the stage 1 level 3 base address from IPA to PA)
- stage 1 level 3 (to obtain the translated address specified as IPA);
- stage 2 level 0; stage 2 level 1; stage 2 level 2; stage 2 level 3 (to translate the translated address from IPA to PA).

In practice, not all of these page table lookups may be needed for every page table walk, as the TLB may cache PTEs from any level, so some steps can be skipped if the corresponding PTE is already available in the TLB.

While FIG. 2 shows an example where the block entry is in the level 3 page table 40-3, it is also possible to define block entries at higher levels of the page table structure, if a single contiguous address mapping is to be used for a larger portion of the address space. For example, a level 1 or level 2 PTE could be a block entry, and in this case the page table walk of the page table structure may terminate after the level 1 or level 2 lookup and it may not be necessary to go through all of the levels.

As shown for the dotted lines labelled 58 in FIG. 2, different addresses with different values for the level 0 index portion 44-0 may map to different level 0 PTEs 42-0 in the level 0 page table 40-0 with different address pointers 48 so that they point to different level one page tables 40-1, and hence different addresses 46 may require separate traverses of different branches through the page table structure to reach the eventual block entry which implicates the translated address. It is possible for some branches to re-converge if some entries in different page tables contain pointers to the same entry at a subsequent level.

Normally, page tables use absolute physical, or intermediate physical, addresses to describe where tables reside in memory. However, for non-volatile memory (NVM) 26, it can be useful to store persistent page table fragments in the non-volatile memory. For example, executables stored in the NVM 26 could contain a relative page table fragment. To map the executable into memory, the OS can set up a page table entry, e.g. an L0 entry, that points to a relative page table in the NVM. This operation may automatically map all of the sections of the executable into memory. Unlike traditional page tables with absolute addresses, the OS does not need to relocate the page table if the NVM is mapped at a new base address (e.g., by moving it to a different system).

Figure 3:
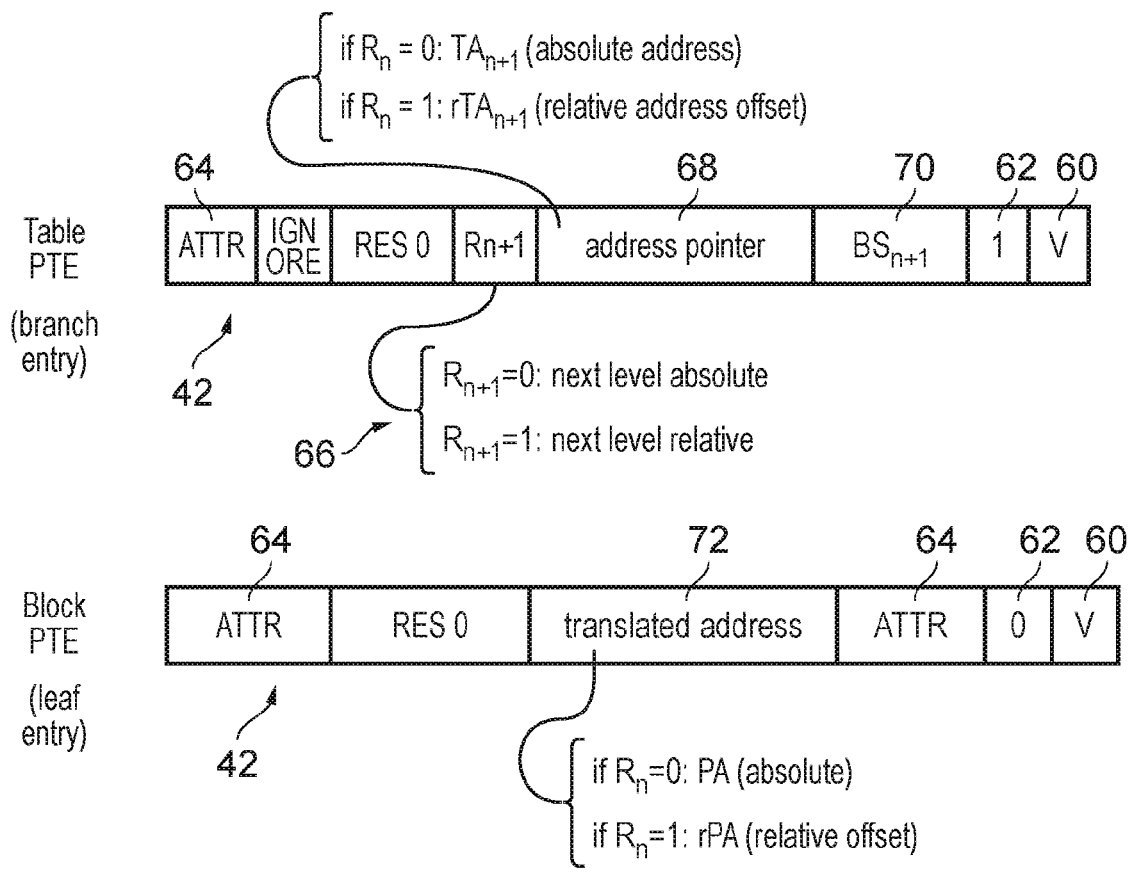
FIG. 3 shows an example format of a page table entry of the page table structure, which supports relative page table pointers.

FIG. 3 shows an example structure of a PTE 42 which can be used to implement such relative address pointers. The format of a table PTE (branch entry) is shown in the upper part of FIG. 3, and the format of a block PTE (leaf entry) is shown in the lower part of FIG. 3. Both types of PTE include a valid bit 60 which specifies whether the information in the PTE is valid. Hence, it is not necessary for an operating system to map all of the PTE's within a given page table 40. If an access is made to a target address which corresponds to an invalid PTE then this may trigger an address translation fault which may trigger an exception which may cause a supervisory process (e.g. the operating system or hypervisor) to re-map the address space to provide a mapping for the accessed address region.

The PTE 42 may also include a table/block flag 62 which indicates whether the PTE is a table PTE or a block PTE. In the example of FIG. 3, if the table/block flag 62 is 1 then the PTE is a table PTE, and if the table/block flag 62 is 0 then the PTE is a block PTE.

Both types of PTE may specify memory attributes 64 which are associated with the region of the address space corresponding to this PTE. For a level 0 PTE, the corresponding part of the address space is the region made up of all addresses which share a level 0 index portion 44-0 having a given value. For a level 1 PTE, the corresponding address region is the region formed of all those addresses which share a given set of values for the level 0 index portion 44-0 and the level 1 index portion 44-1. For a level 2 PTE, the corresponding address region is the region formed of those addresses having a given set of values for each of the level 0, level 1 and level 2 index portions 44-0, 44-1, 44-2. For level 3 PTEs the address region is formed of those addresses having a given set of values for all of the level 0 to level 3 index portions 44-0, 44-1, 44-2, 44-3. The attributes 64 defined for the corresponding address region could for example specify whether the region is read only, or is both readable and writable. The attributes could also specify whether the region is a device type memory region for which reordering of memory accesses compared to the order in which they were issued is not permitted. Also, the memory attribute 64 could specify which privilege levels of the processor core 4 are allowed to access the corresponding address region, or other information for controlling how the corresponding region of memory is allowed to be accessed. In the example of FIG. 3, block PTEs may specify a greater amount of attribute information than table PTEs, although this is not essential.

As shown in FIG. 3, a table PTE may include a next-level PTE type indicator 66 ($R_{n+1}$), which indicates whether the PTEs within the page table 40 at the next level of the page table structure are of an absolute type or a relative type. In this example, if the type indicator 66 is 0, then this indicates that the next level PTEs are of the absolute type, and if the type indicator 66 is 1 then this indicates that PTE at the next level are of the relative type. Using this mapping of the type indicator 66 can be useful for compatibility with legacy software written for an architecture not supporting relative type of PTEs, as a reserved bit which would normally expected to be 0 can be repurposed to indicate the type indicator 66. Block PTEs do not specify the next-level PTE type indicator 66, as for block PTEs there is no next level, as the block PTE is the final level of that branch of the page table structure. In block PTEs, the bit at the same bit position as the type indicator 66 of the table PTE can be reserved for future use, fixed at zero, or used for other information.

In the notation $R_n$ and $R_{n+1}$ described below, for a given table PTE at level n of the page table structure, $R_n$ refers to the type indicator 66 specified in the parent PTE of that table PTE, which defines whether the level-n PTE is of the absolute type ($R_n=0$) or relative type ($R_n=1$), while $R_{n+1}$ is the type indicator 66 specified in a PTE at level n, which defines whether the level-(n+1) PTE at the next level of the page structure is of the absolute type ($R_{n+1}=0$) or the relative type ($R_{n+1}=1$).

Both table and block PTEs specify an address pointer 68, 72. If the parent PTE at a previous level of the page table structure specified $R_n=0$, the address pointer is an absolute value. For a table PTE, the address pointer 68 is used to determine the base address of the page table 40 at the next level of the page table structure. If the level-n PTE at the current level is of the absolute type, then the address pointer is an absolute value directly specifying the base address of the next-level page table. To make the address pointer field 68 shorter, a lower portion of bits all equal to 0 need not explicitly be specified in the address pointer field 68, as these can be implied from the level of the PTE. For a block PTE identified as an absolute type of PTE, the absolute address pointer value 72 identifies the most significant bits of the translated address, with the least significant bits 54 of the translated address 52 being mapped directly from the corresponding bits 54 of the target address 46 as shown in FIG. 2.

Table PTEs which specify that the next-level PTEs are of the relative type ($R_{n+1}=1$) also specify a size parameter 70 ($BS_{n+1}$) which defines a region size which applies to the next-level PTE of the relative type. The region size $BS_{n+1}$ can be used to calculate a reference-point base address $B_{n+1}$ to be used as a reference for a relative address offset specified by the next-level PTE of the relative type.

The region size may be defined as a power of 2 size, using a stored parameter BS which does not explicitly indicate the size, but can be used to calculate the size as follows. In the notation $BS_n$ and $BS_{n+1}$ described below, for a given table PTE at level n of the page table structure, $BS_n$ refers to the size parameter 70 specified in the parent PTE of that table PTE, and $BS_{n+1}$ is the size parameter 70 specified in a PTE at level n, which defines the size for the level-(n+1) PTE. The stored size parameter $BS_n$ can be mapped to a corresponding address region size $S_n$ according to the relation $S_n = 2^{(BS_n + bias)}$, where "bias" is an arbitrary bias constant which is an integer of 0 or more. A given base address $B_n$ can be size-aligned by clearing the least significant bits to zero according to a bit mask calculated according to the inverse of ($S_n-1$). For example, if the bias is 0, then some examples of specifying different region sizes and corresponding bit masks are as follows:

| $BS_n$ | $S_n$ | $S_n - 1$ (Binary) | Bit mask |
|---|---|---|---|
| 1 | 2 | . . . 00000001 | . . . 11111110 |
| 2 | 4 | . . . 00000011 | . . . 11111100 |
| 3 | 8 | . . . 00000111 | . . . 11111000 |
| 4 | 16 | . . . 00001111 | . . . 11110000 |

In practice, the minimum region size required to be supported may be greater than 2 bytes, so the bias can be used to compress the size indicator into fewer bits, by avoiding needing to provide encoding space for encoding region sizes less than the minimum size. For example, if the minimum region size needed is 1 kB (1024 bytes), the minimum value of $S_n$ needed would be 10, so the bias could be set to 10 so that the minimum region size could be defined using $BS_n=0$:

| $BS_n$ | $S_n$ | $S_n - 1$ (Binary) | Bit mask |
|---|---|---|---|
| 0 | 1024 | . . . 0 0011 1111 1111 | . . . 1 1100 0000 0000 |
| 1 | 2048 | . . . 0 0111 1111 1111 | . . . 1 1000 0000 0000 |
| 2 | 4096 | . . . 0 1111 1111 1111 | . . . 1 0000 0000 0000 |
| . . . | | | |

This approach allows fewer bits to be used for encoding region sizes between the minimum and maximum sizes required.

Figure 4:
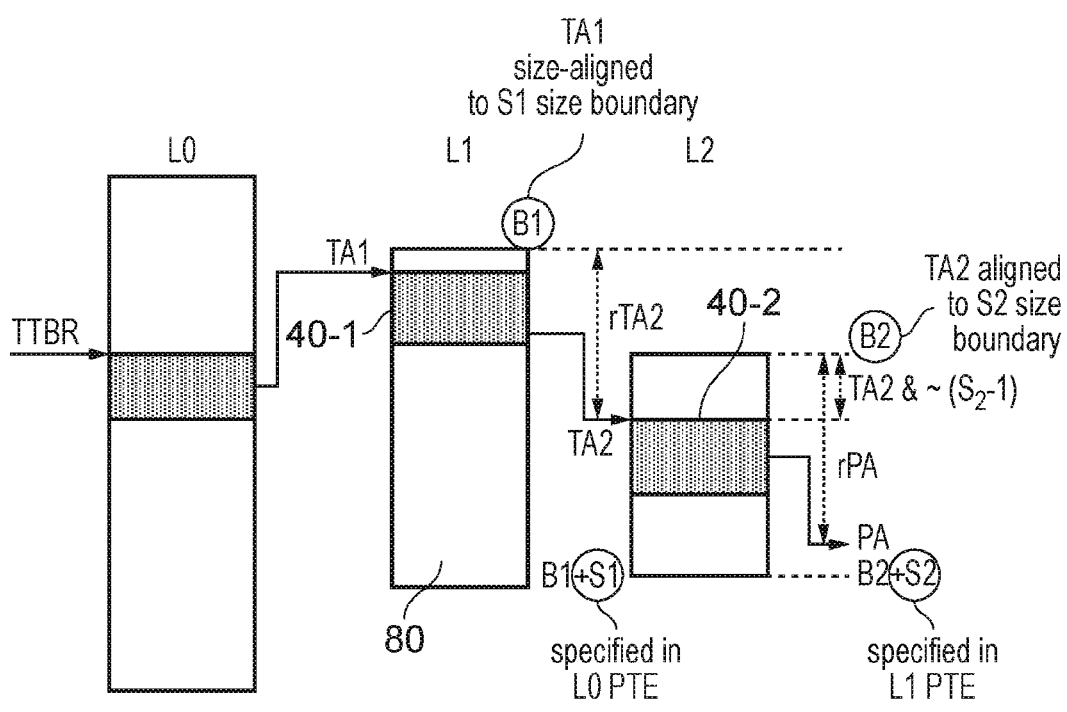
FIG. 4 shows an example of computing an address pointer based on a relative type of page table entry.

As shown in FIG. 4, for relative type of PTEs, the reference-point base address $B_n$ for a given level-n PTE of the relative type can be calculated by combining the bit mask (determined based on the size parameter) with the base address $TA_n$ of the page table comprising the level-n PTE in a bitwise AND operation, to clear the least significant bits of $TA_n$ to 0, with the number of cleared bits depending on the size specified. This generates a size-aligned reference-point base address $B_n$ which is aligned to a size boundary corresponding to the size specified in parameter $BS_n$ in the parent PTE at level (n−1) of the table structure.

For a level-n table PTE of the relative type, the base address $TA_{n+1}$ of a child page table at level n+1 of the page table structure is obtained equivalent to the sum of the reference-point base address $B_n$ and the relative offset value $rTA_{n+1}$ specified in the address pointer field 68 of the level-n PTE. This could be calculated using an adder, but it may be more efficient simply to append the relative offset value $rTA_{n+1}$ to the least significant end of the non-cleared portion of the reference-point base address $B_n$, or to OR $B_n$ with $rTA_{n+1}$, which achieves the same result as adding when $B_n$ is size-aligned.

Prior to combining the offset with the reference-point base address, the relative offset value may have its upper bits masked by ANDing with a mask corresponding to a binary representation of ($S_n-1$) (this mask is the inverse of the bit mask applied for generating the reference point base address $B_n$), to ensure that the sum of the reference-point base address $B_n$ and offset cannot extend beyond the address $B_n+S_n$ marking the end of region of size $S_n$. Also, a certain number of least significant bits of the offset could also be cleared to zero by applying a mask, with the number of cleared bits depending on the granule size (size of one page table) and/or level of the page table within the table structure, to ensure that the end of the accessed page table also cannot extend beyond the end of region $B_n+S_n$. This is discussed in more detail with respect to step 114 below. In some implementations, if any of the masked out bits (at either the upper or lower end of the offset) are non-zero then a fault may be triggered, as this may indicate an invalidly-defined PTE.

Similarly, a level-n block PTE of the relative type specifies a relative offset value in the address pointer field 72, from which the upper part of the translated address can be calculated equivalent to the sum of the base address $B_n$ and the relative offset value rPA specified in the address pointer field 72 of the block PTE (again with masking of the offset value as described above). Again, this does not necessarily require an addition, but could be done with shifters and/or OR logic.

In this example, as any table PTE, including a level 0 PTE, may specify that the next level provides relative addresses, by setting the absolute/relative type flag 66 to 1 in the current PTE, this means that the first level that can contain any relative address pointers is the level 1 page table, and the level 0 page table may be an absolute PTE by default. However, in other examples the TTBR could specify a type indicator indicating whether the level 0 page table is absolute or relative, to allow relative type PTEs to be provided in the level 0 page table as well. Once a certain level of PTE specifies that the next level is relative, then any subsequent levels are required to be the relative type as well, and it is not allowed for a descendent PTE of a relative PTE to be an absolute PTE. Hence, as shown in FIG. 4, the address pointer TA1 specified in the level 0 table entry will always be an absolute pointer and points to a certain level 1 page table 40-1 in the page table structure.

In the example of FIG. 4, we assume that the level 0 PTE specified that the level 1 page table should be of the relative type, and specifies a size parameter 70 which corresponds to a certain region size S1 as indicated in FIG. 4. The reference-point base address B1 is formed by size aligning the table address TA1 of the level-1 page table 40-1 to the size boundary associated with size S1. Note that in FIG. 4, the shaded portion of 40-1 corresponds to the level 1 page table itself, while the unshaded region 80 of size S1 starting from the reference-point base address B1 is the bounding address region within which address pointers specified by the level 1 PTEs and any descendant entries of those PTEs are allowed to be defined. A PTE is selected from the level 1 page table 40-1 based on the level 1 index portion 44-1 of the target address. The sum of the base address B1 and the relative offsets rTA2 specified in the indexed entry of the level 1 page table provides the table address TA2 of the level 2 page table 40-2 at the next level of the page table structure. The level 1 PTEs specifies a size parameter BS2 which identifies a size S2 of a bounding region for its child PTEs at level 2. Again, size-aligning TA2 to the size boundary of size S2 produces the base address B2 which is the reference-point for the relative address pointer 72 specified in the level 2 page table 40-2. In this example, the level 2 PTE is a block PTE and so the address pointer specified using the relative offset rPA gives the translated address PA and so there is no further traverse of the page table structure.

Hence, in summary, page table walks start with absolute pointers in the TTBR and the L0 page table. Any table, including L0, may specify that the next level provides relative addresses by setting a relative next bit in the current page table. Once a level specifies that the next level is relative, any subsequent levels must be relative as well.

When specifying that the next level provides relative addresses, the current level also specifies the size, S, of the permissible memory region that the next level can address. Based on the pointer to the next level, $TA_{n+1}$, and the size of the level, $S_{n+1}$ we define a bounding memory region for that level. The bounding memory region is naturally aligned and has a base address, $B_{n+1}$, and size $S_{n+1}$. The base is calculated by aligning the table address: $B_n=TA_n$ & $\sim(S_n-1)$. Relative pointers are resolved relative to the base of the region where the current table lives. For example: $TA_{n+1}=B_n|rTA_{n+1}$. Relative block entries are resolved in the same way as relative table pointers.

The MMU may implement some safety checks which can be useful for securely allowing fragments of the page table structure defined using relative address pointers to be stored in the non-volatile memory 26 so that they may be embedded within executable code written by a potentially untrusted software developer, other than the developer of the operating system or hypervisor which is defining the page table structure at higher levels. These checks may be as follows:

The bounding memory region 80 at level n should be a subset of level n−1. The CPU should fault if this is not the case. This applies to both table entries and block entries. Both the beginning and the end of the block at level n should fall within the region at level n−1.

Table entries at level n should be flagged as relative if level n−1 is flagged as relative. The CPU should fault if this is not the case.

The combination of these checks ensures that once a given PTE marks the next level of the page table structure as being relative then all subsequent descendants of that PTE will also be relative, so that the operating system can remap an entire portion of the address space pointed to by that branch of the page table structure simply by changing the absolute address pointer at the last level comprising absolute PTEs. Also, it means that it can be guaranteed that any relative address pointers defined at subsequent levels of the PTEs cannot point to any addresses outside the bounding address region 80 that was specified at the highest level of PTE defined as a relative type of PTE.

With the approach shown in FIG. 4, as long as the size parameter 70 for a child entry is not larger than the size parameter for its parent entry, then the address regions of the child PTE and any descendant PTEs will always be within the bounding address region entry defined by the top-most relative type of PTE, which means that even if the device in which the relative fragment of the page table structure is untrusted, or the developer of software associated with that fragment of the page table cannot be trusted, then a higher privileged process such as an operating system or hypervisor can still trust that once a given region 80 of the address space has been mapped as suitable for use of relative page tables, then all mappings provided by another party within subsequent levels of the page table structure will not extend outside the region 80 and so addresses in other regions of the overall address space may be safe from inappropriate access. This can be seen in FIG. 4 where the pointers for region B2 to B2+S2 defined for level 2 are restricted, as a consequence of the size-alignment for calculating the base address for the relative offsets, to being within the region 80 defined as the bounding region for level 1.

Figure 5:
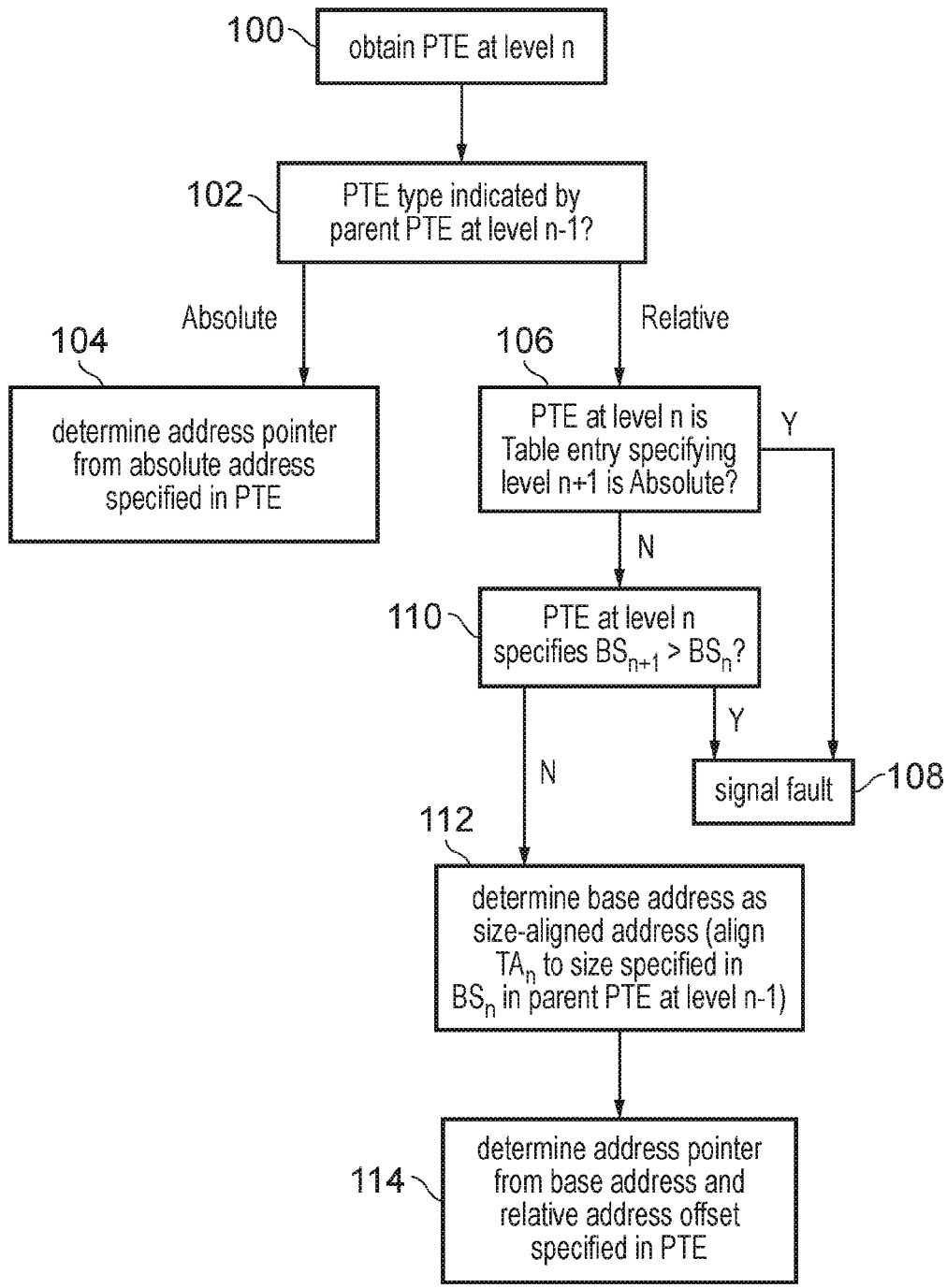
FIG. 5 is a flow diagram showing a method of performing a page table walk.

FIG. 5 is a flow diagram showing a method of performing a page table walk to locate entries for use by the MMU 12. FIG. 5 shows the steps performed when reaching a given level, level n, of the page table structure. It will be appreciated that this method may then be repeated for each level reached by traversing the address pointers from parent PTE to child PTE. In the example of FIG. 2, n may be between 0 and 3, i.e. the maximum number of page table levels is 4, but other examples could support a maximum number of levels smaller or greater than 4.

Also, it will be appreciated that not every memory access may require a page table walk. If the full translation mapping between target address and translated address is already cached in the TLB, then no page table walk is required.

Also, in cases when the page table walk is required, it is not always necessary to traverse through all of the levels of the PTE. Some TLBs may cache partial translations (e.g. a mapping from VA to the address of a PTE at a certain level of the tree structure, e.g. from VA to level 2). In this case, there is no need to walk the page table structure at levels 0 and 1, as the cached information in the TLB can be used to obtain the relevant PTE from level 2 and then proceed to identify the next-level PTE to be accessed at level 3.

Hence, FIG. 5 shows the steps performed if a page table access is required for a certain level, n, of the page table structure. At step 100 the page table walk circuitry 16, 36 obtains the relevant PTE at level n of the page table structure. To identify the address of the required PTE, the page table walk circuitry 16, 36 adds a level-n page table base address to an offset determined from the level-n index portion 44-$n$ of the target address (again, an adder may not be needed, as an equivalent result may be obtained by shifters or OR gates if the base address is size aligned). If n=0, the level-0 base address is obtained from the translation table base register (TTBR), while if n>0, then the base address of the level-n page table is identified based on an address pointer in a parent PTE at level n−1. Either way, the address of the required PTE is identified. If the current level of the page table walk is associated with a 1-stage MMU which translates directly from virtual address to physical address, or with stage 2 of a 2-stage MMU which translates from intermediate physical address (IPA) to physical address (PA), the address obtained from the level-n base address Tn and the level-n index portion 44-$n$ is a physical address which can be specified in a memory access request to read the required PTE from the memory system. On the other hand, if this step of the translation process relates to stage 1 of a 2-stage MMU, the acquired address of the PTE is an IPA which then may require further stage 2 translation to obtain the physical address of the required PTE.

Hence, the PTE corresponding to the level-n index portion 44-$n$ of the target address 46 is obtained at step 100, either from the TLB 14, 34 or from the memory system. At step 102 the page table walk circuitry 16, 36 identifies what type of PTE was indicated by a parent PTE at the previous level n−1 of the page table structure. For example, referring to FIG. 2, for PTE 42-2 at level 2, the parent PTE would be the PTE 42-1 at level 1 which contains the address pointer to the level 2 page table 40-2 containing the level 2 PTE 42-2. If the type indicator 66 in the parent PTE indicated that the PTE at level n is of the absolute type, then at step 104 the address pointer for the PTE at level n is determined from the absolute address 68, 72 directly specified in that PTE. If the PTE at level n is a block PTE then this would terminate the traverse of the page table structure (although if the translated address is an IPA a further traverse of the stage 2 page table structure may still be needed). If the PTE at level n is a table PTE then the address pointer 68 identifies an address of a page table at a subsequent level which can then be obtained in a further pass through the method of FIG. 5.

If at step 102 the level-n PTE was indicated by the parent PTE at level n−1 to be of the relative type ($R_n=1$), then at step 106 the page table walk circuitry 16, 36 determines whether the level-n PTE specifies a type indicator 66 indicating that its child PTEs at level n+1 are of the absolute type ($R_{n+1}=0$). If so, then at step 108 a fault is triggered. Hence, a relative PTE may only specify further relative PTEs as children. This ensures that relative fragments of the address table can freely be re-mapped by simply updating the last absolute pointer defined in one of its ancestors in the page table structure, without needing individual remapping of the address pointers in every subsequent PTE in the relative portion of the page table.

At step 110, a second safety check may be performed to determine whether the level-n PTE specifies a size parameter 70 ($BS_{n+1}$) which indicates a larger size than the size parameter 70 ($BS_n$) that was specified by its parent PTE at level n−1. If the size specified by the level n−1 parent PTE is larger than the size specified by the level-n child PTE, then again at step 108 a fault is signalled. As base addresses for relative offsets at level n are size-aligned versions of the table address of the level-n page table, preventing the size increasing from parent to child provides a guarantee that any subsequent offsets within the relative portion of the page table will lie within the bounding region defined for the very first relative PTE encountered on the current branch through the page table structure.

The checks at steps 106 and 110 may be performed in either order, or may be performed in parallel with each other.

If neither of steps 106, 110 triggers a fault, i.e. the child PTE at level n specifies that level n+1 is relative and specifies a size less than or equal to the size specified in its parent PTE, then the method proceeds to step 112. At step 112 the reference-point base address $B_n$ for the level-n PTE is determined as a size-aligned address, which corresponds to aligning the table address $TA_n$ for the current level-n page table 40-$n$ (from which the level-n PTE being read was extracted) to a natural address boundary corresponding to size $S_n$ identified by the size parameter $BS_n$ specified in the parent PTE at level n−1. A natural address boundary is a boundary which corresponds to an integer multiple of the size (e.g. for 4 kB size the address boundaries would be at 4 kB, 8 kB, 12 kB etc). The base address $B_n$ and size $S_n$ together define a bounding address region within which the relative specified address pointers of the current PTE at level n and subsequent descendant PTEs are allowed to be defined.

At step 114 masking is applied to the relative address offset specified in the address pointer field 68, 72 of the PTE at level n. In the masking, some upper bits of the offset are cleared to zero by masking based on a mask ($S_n$−1), and some lower bits are cleared to zero by masking. For table entries, the lower bits are cleared based on a mask ~(G−1), where G is the granule size of the page table structure. For block entries, the lower bits to be cleared are those bits which correspond to fields 54 and 44-X for all X greater than the level that contains the block entry (i.e. the offset does not affect the bits that are directly mapped from the VA for a block entry at that level of the page table structure). These masking operations ensure that both the start and end of the page table or granule accessed using the address pointer will be within the region of size $S_n$ starting at base address $B_n$. In some examples, if any of the masked out bits were non-zero in the original (unmasked) relative address offset, a fault may be triggered. At step 114, the address pointer is determined from the reference-point base address Bn that is determined at step 112 and the masked relative address offset, by generating a result equivalent to the sum of the reference-point base address and relative address offset. The address pointer can then be used to form either the address of a child PTE at the next level n+1 of the page table (in the case when the level-n PTE is a table PTE), or the translated address (in the case when the level-n PTE is a block PTE).

If the level-n PTE is a block PTE, no further steps through the page table structure are required (although as mentioned above if the returned address is an IPA a second stage of address translation may be required). If the level-n PTE is a table PTE, n is incremented by 1 and then the method of FIG. 5 is repeated again for the next level of the page table structure.

In the examples shown above, the size parameter $BS_{n+1}$ is explicitly specified within a parent PTE, to indicate the size of the bounding address region for the child PTE at the next level of the page table structure. Also, in the examples above, the base address $B_n$ from which the relative address pointer is to be computed using the relative address offset is implicitly determined by size-aligning the address of the page table at level n to a size boundary determined based on the size parameter $BS_n$ specified by its parent PTE.

Figure 6:
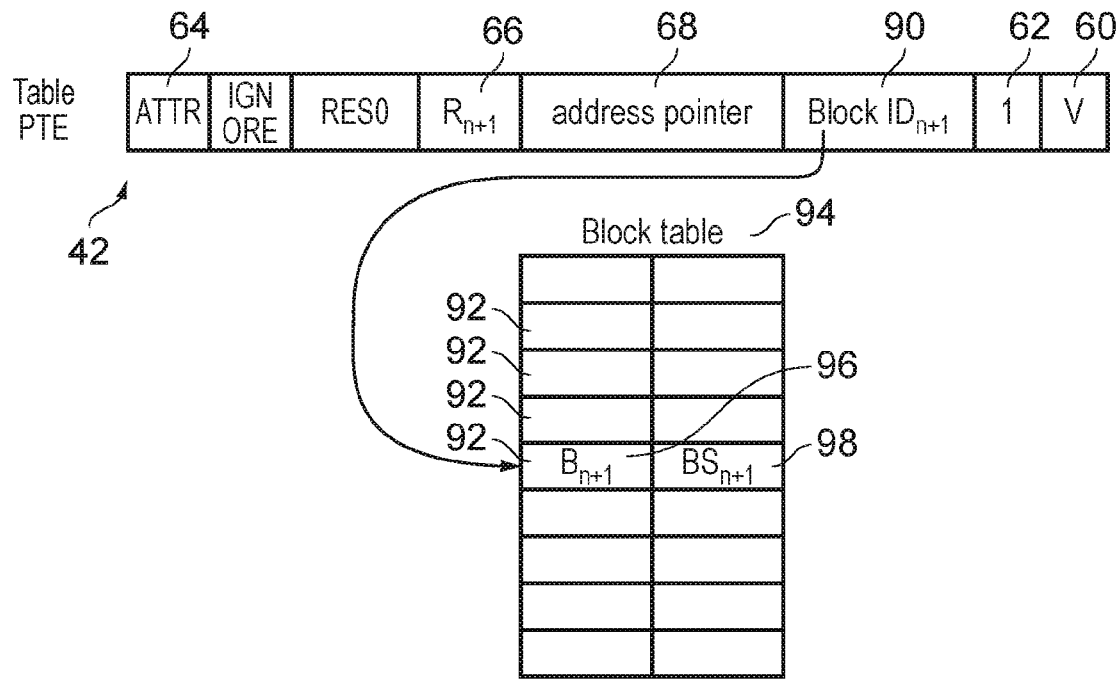
FIG. 6 shows a second example in which a block table is used to indicate the base address and size of a bounding address region.

However, as shown in FIG. 6 another approach can be that a table PTE could specify a block identifier 90 instead of the size parameter 70. The block identifier 90 identifies a particular block entry 92 within a block table 94, which is a separate table structure from the page table structure. Each block entry 92 specifies a base address 96 and size parameter 98 which can then be used as the base address $B_{n+1}$ and size parameter $BS_{n+1}$ to use for the determining address pointers for child PTEs at the next level (n+1) of the page table structure. The address pointer 68 can still specify a relative offset as before, and all the other fields 60, 62, 66, 64 can be the same as in the example of FIG. 3.

Hence, as shown in FIG. 6 it is not essential for the base address or size parameter to be explicitly indicated in the PTE itself.

If the approach shown in FIG. 6 is used, a mechanism may be provided to allow a child PTE to "inherit" the block specification from the parent. This could be implemented by reserving a predetermined block identifier (e.g., block ID 0) to mean "stay in block defined by parent", or by having a convention where subsequent relative type indicators 66 (or descendant entry restricted flags in the example of FIG. 7 below) are not set for child entries (they would just inherit the property from the parent in that case) unless they update the block specification. Providing such an inheritance mechanism is useful because it means that child entries do not themselves need to specify information on the block table, which improves security because the block table may be managed by the OS/hypervisor and the page table fragments may live on a removable (non-volatile) medium, so that it would be desirable not to encode information from the block table on the removable medium.

In the examples discussed above, once PTEs are marked as relative type then this also implies that descendant PTEs of the relative type of PTE are constrained to specify address pointers which are within a certain bounding address region 80 defined for the very first level of relative PTE. Hence, the relative/absolute type indicator 66 could also be considered to be a descendent-entries-restricted indicator which indicates whether descendent entries of the PTE are restricted to define address pointers within a certain bounded address region. However, in other approaches it may also be desirable to apply such bounds on the address pointers of subsequent levels in the page table structure to absolute types of PTE.

Figure 7:
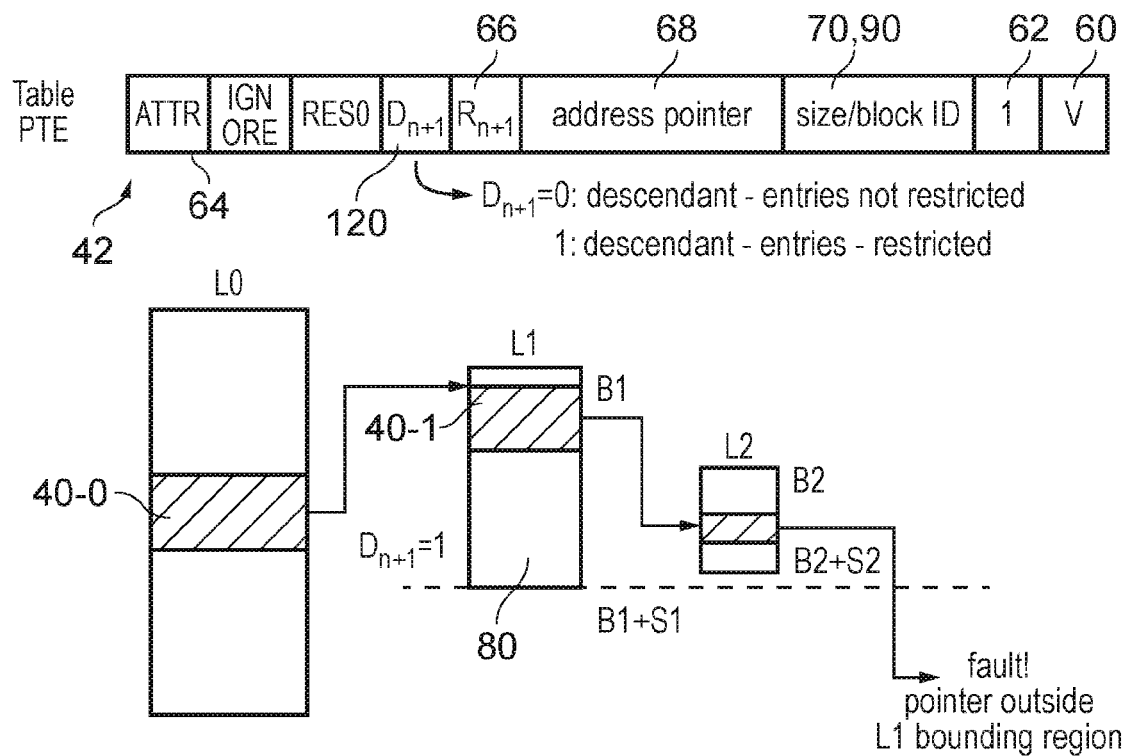
FIG. 7 shows an example of a page table entry comprising a descendant-entries-restricted indicator.

Hence, in some implementations a PTE format as shown in FIG. 7 may be used. Fields 64, 66, 68, 70 or 90, 62 and 60 of the PTE may be the same as in FIG. 3 or FIG. 6. However, in FIG. 7 the PTE may also include descendant-entries-restricted flag 120 which indicates whether any descendant entries are restricted to only specify pointers within a defined bounding address region 80 ($D_{n+1}=1$) or are allowed to specify pointers outside the bounding region 80 ($D_{n+1}=0$). The bounding address region can be defined either through the base address and size in the block table as shown in FIG. 6 (hence allowing relatively arbitrary definitions of the bounding region), or by size-aligning the base address of the current level of page table based on a size specified by the parent PTE of that page table, as shown in FIG. 4.

For branches of the table structure which include relative PTEs, the calculation of the address pointers using relative offsets from a size-aligned base address, and the masking applied to the relative address offset, may (provided it is not possible to increase the size from parent-to-child as discussed with respect to step 110) guarantee it is not possible for a descendant PTE to define an address pointer outside the bounding region defined for an earlier PTE.

However, for absolute portions of the page table, or for relative PTEs where the bounding region is defined using arbitrary base address and size in the block table, the address pointer 68 at a given level n could conceivably be defined to point outside the bounding address region defined for an earlier region in the same branch of the page table structure. For example, in FIG. 7 a PTE in the level 0 page table 40-0 defines $D_{n+1}=1$ to define its descendants as "descendant-entries restricted". The level 0 PTE defines the bounding address region 80 for its child PTEs at level 1. In this example, the bounding region starts at base address B1 and has size S1. While the address pointer specified in the level 1 PTE is within that region, the child PTE at level 2 in this instance specifies an absolute address pointer 68 which points to a location outside the bounding address region 80 defined for level 1, and so this will trigger the page table walk circuitry 16, 36 to signal a fault. In contrast if the descendant-entries-restricted flag 120 in both the L0 and L1 PTEs was 0 then no fault would be generated (at least for absolute type of PTEs) even if the address pointer in the L2 PTE extends outside the bounding region 80 for the earlier L0 PTE.

In some embodiments, to track the bounding address region defined for a given level of PTE, some tracking information may be recorded by the page table walk circuitry 16, 36, e.g. defining a base address and size of the bounding address region, or start and end addresses for the bounding address region. On encountering a descendant PTE at a subsequent level, the page table walk circuitry 16, 36 could compare the address pointer of that PTE with the bounding address region defined by its ancestor PTE, to determine whether to signal a fault. Multiple sets of tracking information could be maintained for PTEs at different levels of the page table structure.

Alternatively, in the case where the bounding address region is defined as a size-aligned version of the page table address as discussed above, it is not necessary to store this tracking information, as in this case a simple comparison of the size parameters of the parent and child entries can be sufficient to implement the bounds check of subsequent address pointers. This can be more efficient, as it means the page table walk circuitry 16, 36 may have less hardware for comparing addresses and storing tracking information on bounding address regions defined by earlier PTEs in the page table walk.

By allowing address pointers to be bound by certain region boundaries for absolute PTEs as well as relative PTEs, this can allow operating systems or hypervisors to delegate management of certain sub-portions of the page table structure to other software processes or to the software developers of a certain persistent piece of acceptable code to be stored in non-volatile memory 26, in the confidence that having defined a certain level of PTE as mapping to a particular region 80 of the address space, it is guaranteed that any subsequent mappings produced by descendant entries will also be within that region, so that there is no scope for a malicious party to modify the descendant PTEs to point to inappropriate addresses.

In some examples, an indication of $D_{n+1}=0$ could be overridden by an indication of a later PTE as of the relative type, i.e. relative type of PTEs may by default by considered "descendant-entries-restricted", but absolute type of PTEs may be either "descendant-entries-restricted" ($D_{n+1}=1$) or not ($D_{n+1}=0$).

Other examples may also allow relative type of PTEs to be distinguished as either "descendant-entries-restricted" ($D_{n+1}=1$) or not ($D_{n+1}=0$). This could allow the supervisory process controlling the upper levels of the page table structure to decide whether a device defining later levels of the page table structure can be trusted or not, and set the descendant-entries-restricted flag 120 accordingly ($D_{n+1}=1$ if untrusted, $D_{n+1}=0$ if trusted).

While FIG. 7 shows a PTE format which combines both the absolute/relative type indicator 66 and the indicator 120 of whether the descendant entries are restricted, the descendant-entries-restricted indicator 120 could also be provided in a PTE format which does not support relative types of PTEs at all, and in this case the absolute/relative type indicator 66 could be omitted.

Figure 8:
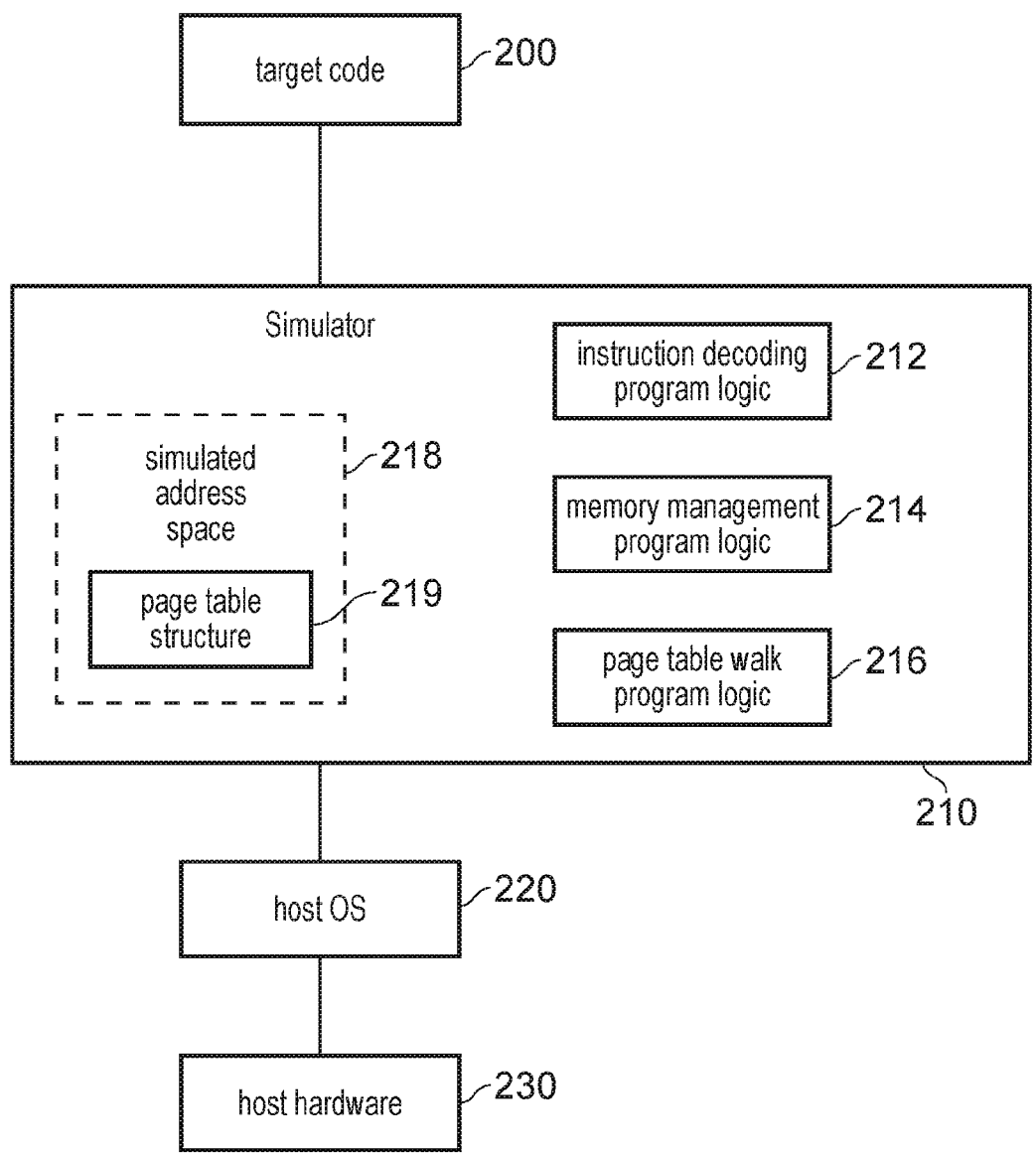
FIG. 8 shows an example of a simulator program for controlling a host data processing apparatus to provide an instruction execution environment for execution of instructions.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including instructions which define page table structures having the properties discussed above, may be executed from within the instruction execution environment using the simulator program 210, so that a host computer 230 which does not actually have the hardware features of the apparatus 2 discussed above can emulate these features.

The simulator program 210 may include instruction decoding program logic 212 which maps instructions specified by the target code 200 to corresponding functionality defined using native instructions supported by the host hardware 230. The simulator program 210 also includes memory management program logic 214 and page table walk program logic 216, defined using native instructions supported by the host hardware 230, which emulates the functionality of the MMU 12, 32 and page table walk circuitry 16, 36 of the apparatus 2 discussed above. The memory management program logic 214 may allow the simulator program 210 to simulate the presence of a simulated address space 218. From the point of view of the target code 200, data and instructions are stored in a memory addressed based on the simulated address space 218, but the memory management program logic 214 may control: simulated address translation of simulated virtual addresses to simulated physical addresses under control of the page table structure 219 as discussed above, followed by further mapping of the simulated physical addresses to addresses used by the host hardware (this further mapping may include native address translations by an MMU of the host hardware 230 to obtain the physical addresses actually storing the relevant data in the memory of the host hardware 230). Hence, when performing the simulated address translation, the page table structure 219 may be walked by the page table walk program logic 216 using absolute or relative address pointers in the same way as discussed above. This allows software designed for an apparatus supporting the features discussed above to be executed on a host platform not supporting those features, as the missing features may be emulated in software by the simulator program 210.

The simulator program 210 shown in FIG. 8, which controls a host data processing apparatus to provide an instruction execution environment for execution of instructions of target programs, is one example of a computer program which may provide software support for page table walks based on the page table structures of the type discussed above.

However, other software examples may be provided which may have the page table walk program logic 216, but need not provide the instruction decoding program logic 212, memory management program logic 214 or emulation of a simulated address space 218.

For example, in a second example of software-controlled page table walks, a host apparatus may have its own TLB hardware and memory management hardware, however population of the TLB may be at least partially managed by software, such as an operating system. Hence, in this case, the page table structure is stored in the host address space of the host apparatus, not in a simulated address space. The host apparatus may have hardware for triggering page table walks when requests for address translation miss in the TLB, but in addition the TLB may be software-managed so that the operating system may include page table walk program logic 216 for requesting fetching of certain PTEs from the page table structure based on a specified target address, with information based on the fetched PTEs then loaded into the TLB. Such page table walk program logic 216 may support use of relative page tables or page tables with restrictions on pointers in descendant entries as discussed above.

In a third example, the host apparatus may have hardware support only for absolute page tables or page tables which do not allow restriction on the region in which descendant entries define pointers, but it may be desirable to allow the host apparatus to execute software written for systems which do provide hardware support for relative page tables or descendant-entry-restricted PTEs. In this case, software executing on the host apparatus (e.g. the operating system) could perform page table walks of the relative page tables under software control, and map the identified address translation mappings and page table entries to corresponding absolute-type PTEs defined in a shadow page table structure stored in a different part of the address space. The TTBR of the host hardware could then point to the shadow (absolute) page table structure instead of the actual (relative) page table structure used by the target software being executed. Hence, again this may be an example of a computer program which includes page table walk program logic 216 to obtain page table entries from a page table structure, based on use of relative address pointers and/or descendant-entries-restricted indicators as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   memory management circuitry to translate memory addresses based on page table entries defined in a page table structure comprising a plurality of levels of page tables stored in a memory system; and
   page table walk circuitry to obtain the page table entries from the page table structure for use by the memory management circuitry, each page table entry identifying an address pointer for identifying one of: a translated address, and an address of a child page table at a next level of the page table structure; in which:
   when a given page table entry is a relative type of page table entry specifying a relative offset value indicating an offset of the address pointer relative to a reference-point base address determined for the given page table entry, the page table walk circuitry is configured to determine the address pointer from the reference-point base address and the relative offset value;
   when the given page table entry is an absolute type of page table entry specifying an absolute address value directly specifying the address pointer, the page table walk circuitry is configured to determine the address pointer from the absolute address value; and
   the page table walk circuitry is configured to determine whether the given page table entry is the relative type or the absolute type, based on a type indicator specified in a parent page table entry at a previous level of the page table structure.

2. The apparatus according to claim 1, in which the page table walk circuitry is configured to signal a fault in response to detecting that a child page table entry of the given page table entry is the absolute type when the given page table entry is the relative type.

3. The apparatus according to claim 1, in which a top-level page table entry of the page table structure is restricted to be the absolute type of page table entry.

4. The apparatus according to claim 1, in which a leaf page table entry, for which the address pointer identifies the translated address, is allowed to be the relative type of page table entry.

5. The apparatus according to claim 1, in which the page table walk circuitry is configured to obtain the reference-point base address for said given page table entry from a selected entry of a block table, said selected entry of the block table selected based on a block table entry identifier specified in a parent page table entry of the given page table entry.

6. The apparatus according to claim 1, in which the relative type of page table entry is associated with a size parameter, the reference-point base address and the size parameter together identifying a bounding address region for the address pointer specified by the relative type of page table entry.

7. The apparatus according to claim 6, in which when the given page table entry is the relative type of page table entry, the page table walk circuitry is configured to signal a fault when the address pointer specified by a descendant page table entry of the given page table entry is outside the bounding address region identified for the given page table entry.

8. The apparatus according to claim 6, in which the size parameter is directly specified in a parent page table entry of the relative type of page table entry.

9. The apparatus according to claim 6, in which the size parameter is specified in a selected entry of a block table, said selected entry of the block table selected based on a block table entry identifier specified in a parent page table entry of the relative type of page table entry.

10. An apparatus comprising:
    memory management circuitry to translate memory addresses based on page table entries defined in a page table structure comprising a plurality of levels of page tables stored in a memory system; and
    page table walk circuitry to obtain the page table entries from the page table structure for use by the memory management circuitry, each page table entry identifying an address pointer for identifying one of: a translated address, and an address of a child page table at a next level of the page table structure; in which:

when a given page table entry is a relative type of page table entry specifying a relative offset value indicating an offset of the address pointer relative to a reference-point base address determined for the given page table entry, the page table walk circuitry is configured to determine the address pointer from the reference-point base address and the relative offset value; and the page table walk circuitry is configured to determine, as the reference-point base address for said given page table entry, a size-aligned address corresponding to a result of aligning an address of a page table comprising the given page table entry to an address size boundary selected based on a size parameter specified for the given page table entry by a parent page table entry of the given page table entry.

11. The apparatus according to claim 10, in which when the given page table entry is the relative type of page table entry, the page table walk circuitry is configured to signal a fault when the size parameter identified for a child page table entry of the given page table entry indicates a larger size than the size parameter associated with the given page table entry.

12. A non-transitory computer-readable medium to store a computer program comprising:

page table walk program logic to obtain page table entries from a page table structure comprising a plurality of levels of page tables, each page table entry identifying an address pointer for identifying one of: a translated address, and an address of a child page table at a next level of the page table structure; in which:

when a given page table entry is a relative type of page table entry specifying a relative offset value indicating an offset of the address pointer relative to a reference-point base address determined for the given page table entry, the page table walk program logic is configured to determine the address pointer from the reference-point base address and the relative offset value;

when the given page table entry is an absolute type of page table entry specifying an absolute address value directly specifying the address pointer, the page table walk program logic is configured to determine the address pointer from the absolute address value; and the page table walk program logic is configured to determine whether the given page table entry is the relative type or the absolute type, based on a type indicator specified in a parent page table entry at a previous level of the page table structure.

13. An apparatus comprising:

memory management circuitry to translate memory addresses based on page table entries defined in a page table structure comprising a plurality of levels of page tables stored in a memory system; and page table walk circuitry to obtain the page table entries from the page table structure for use by the memory management circuitry, each page table entry identifying an address pointer for identifying one of: a translated address, and an address of a child page table at a next level of the page table structure; in which:

when a given page table entry specifies a descendant-entries-restricted indicator, the page table walk circuitry is configured to signal a fault when a descendant page table entry of the given page table entry identifies an address pointer lying outside a bounding address region identified by the given page table entry.

14. The apparatus according to claim 13, in which the bounding address region comprises a region of a specified size starting at a reference-point base address;

the given page table entry specifies a size parameter indicating the specified size.

15. The apparatus according to claim 14, in which the reference-point base address comprises a size-aligned address corresponding to a result of aligning an address of a page table comprising a child page table entry of the given page table entry to an address size boundary selected based on the size parameter.

16. The apparatus according to claim 13, in which the given page table entry specifies a block table entry identifier identifying an entry of a block table specifying a reference-point base address and size of the bounding address region.

17. A method comprising:

performing a page table walk to obtain, for use in translating memory addresses, page table entries from a page table structure comprising a plurality of levels of page tables stored in a memory system each page table entry identifying an address pointer for identifying one of: a translated address, and an address of a child page table at a next level of the page table structure;

in response to detecting that a given page table entry specifies a descendant-entries-restricted indicator, and a descendant page table entry of the given page table entry identifies an address pointer lying outside a bounding address region identified by the given page table entry, signalling a fault.

18. A non-transitory computer-readable medium to store a computer program comprising:

page table walk program logic to obtain page table entries from a page table structure comprising a plurality of levels of page tables, each page table entry identifying an address pointer for identifying one of: a translated address, and an address of a child page table at a next level of the page table structure; in which:

when a given page table entry specifies a descendant-entries-restricted indicator, the page table walk program logic is configured to signal a fault when a descendant page table entry of the given page table entry identifies an address pointer lying outside a bounding address region identified by the given page table entry.

* * * * *